United States Patent
James

(10) Patent No.: US 9,726,110 B2
(45) Date of Patent: Aug. 8, 2017

(54) AIRCRAFT PROPULSION SYSTEM FAN CASE COMPRISING THRUST REVERSING ASSEMBLY

(71) Applicant: ROHR, INC., Chula Vista, CA (US)

(72) Inventor: Norman J. James, San Diego, CA (US)

(73) Assignee: ROHR, INC., Chula Vista, CA (US)

( * ) Notice: Subject to any disclaimer, the term of this patent is extended or adjusted under 35 U.S.C. 154(b) by 667 days.

(21) Appl. No.: 14/090,595

(22) Filed: Nov. 26, 2013

(65) Prior Publication Data

US 2015/0143795 A1 May 28, 2015

(51) Int. Cl.
*F02K 1/72* (2006.01)
*F02K 1/76* (2006.01)

(52) U.S. Cl.
CPC ............... *F02K 1/72* (2013.01); *F02K 1/763* (2013.01); *F02K 1/766* (2013.01); *F05D 2250/41* (2013.01); *F05D 2250/411* (2013.01)

(58) Field of Classification Search
CPC ... F02K 1/70; F02K 1/72; F02K 1/763; F02K 1/766; F02K 1/09; F02K 3/075
See application file for complete search history.

(56) References Cited

U.S. PATENT DOCUMENTS

| | | |
|---|---|---|
| 3,483,702 A | 12/1969 | Ward |
| 3,511,055 A | 5/1970 | Timms |
| 3,603,090 A * | 9/1971 | Billinger ............ F02K 1/72 239/265.29 |
| 4,545,199 A | 10/1985 | Sankey et al. |
| 2010/0107599 A1 * | 5/2010 | Vauchel ............ B64D 29/08 60/226.2 |
| 2011/0023450 A1 * | 2/2011 | Stuart ............ F02K 1/72 60/226.2 |
| 2013/0067884 A1 * | 3/2013 | Bhatt ............ F02K 1/72 60/204 |
| 2013/0067885 A1 * | 3/2013 | Suciu ............ F02K 1/70 60/226.2 |

OTHER PUBLICATIONS

Extended European Search Report dated Apr. 15, 2015 in European Application No. 14194342.3.

* cited by examiner

*Primary Examiner* — Pascal M Bui Pho
*Assistant Examiner* — Marc Amar
(74) *Attorney, Agent, or Firm* — Snell & Wilmer, L.L.P.

(57) ABSTRACT

An aircraft propulsion system may include a generally annular fan case defined by a fan configured to be disposed at a forward end thereof and a stator blade array configured to be disposed at an aft end thereof, a thrust reversing assembly comprising at least a portion of the fan case, the fan case comprising a generally annular cascade array, and/or a sleeve situated at least partially about the cascade array, the sleeve configured to deploy to expose the cascade array. The aircraft propulsion system may further comprise a blocker door coupled to at least one of the cascade array and an inner surface of the fan case, the blocker door configured to deploy to redirect airflow through the cascade array.

11 Claims, 3 Drawing Sheets

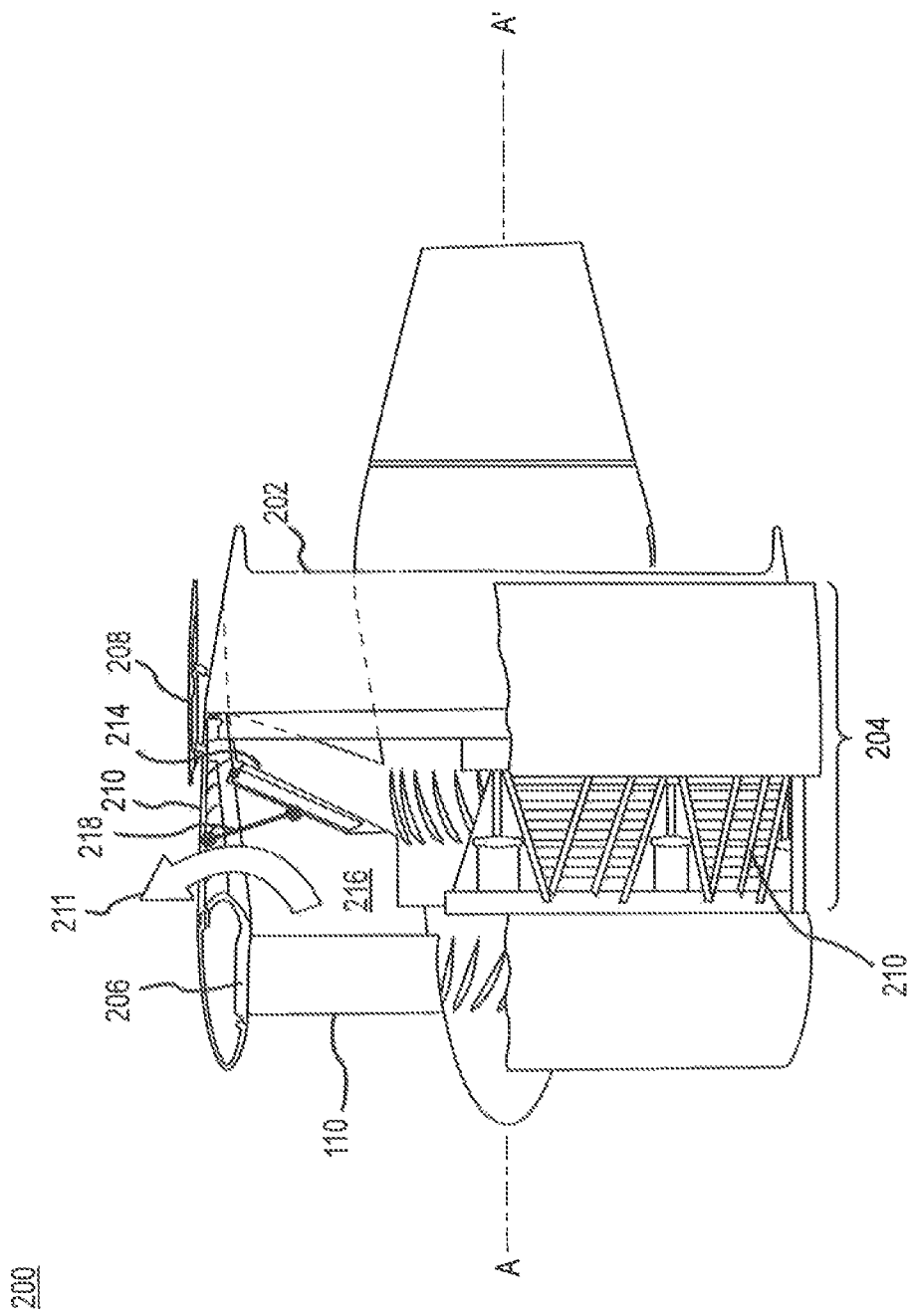

AIRCRAFT PROPULSION SYSTEM FAN CASE COMPRISING THRUST REVERSING ASSEMBLY

FIELD

The present disclosure relates to a nacelle system for a jet aircraft propulsion system, and more particularly, to a thrust reversing assembly of a nacelle system.

BACKGROUND

Jet aircraft propulsion systems (such as those that power modern commercial aircraft) typically include a structure known as a nacelle. The nacelle may include a variety of components, including an inner fixed structure ("IFS") situated substantially concentrically about an engine core. An aerodynamic structure known as an outer barrel (which may be divided into a variety of sections) may be situated substantially coaxially with and concentrically about the IFS. The radial separation between the inner surface, of the outer barrel and the outer surface of the IFS may define a bypass air duct through which bypass air may flow. Further, air may flow over an outer barrel during flight. This airflow may be defined as a "slip stream."

The nacelle may comprise a thrust reversing assembly. The thrust reversing assembly may comprise a vented structure known generally as a cascade array. During operation, a translating sleeve comprising a portion of the outer barrel may translate or shift aft to expose the cascade array to create a passage from the bypass duct through the outer barrel. A plurality of structures typically referred to as blocker doors may deploy within the bypass air duct to turn airflow in the bypass air duct through the cascade array. As airflow is turned through the cascade array, the thrust reversing assembly may generate reverse thrust.

SUMMARY

An aircraft propulsion system comprising a generally annular fan case defined by a fan configured to be disposed at a forward end thereof and a stator blade array configured to be disposed at an aft end thereof, a thrust reversing assembly comprising at least a portion of the fan case, the fan case comprising a generally annular cascade array, and/or a sleeve situated at least partially about the cascade array, the sleeve configured to deploy to expose the cascade array. The aircraft propulsion system may further comprise a blocker door coupled to at least one of the cascade array and an inner surface of the fan case, the blocker door configured to deploy to redirect airflow through the cascade array. The aircraft propulsion system may further comprise a blocker door configured to cover an inner surface of the cascade array such that bypass air flows through a bypass air duct defined between the blocker door and an inner fixed structure disposed radially inward of the blocker door. The aircraft propulsion system may further comprise a substantially annular outer barrel, the outer barrel comprising a fan cowl situated concentrically about the fan case, the sleeve comprising a portion of the fan cowl. The sleeve may translate axially in an aft direction to expose the cascade array. The sleeve may hinge radially outward from the cascade array to expose the cascade array. The aircraft propulsion system may further comprise a blocker door that is angled into the direction of airflow within a bypass air duct, and wherein an actuating mechanism coupled to the blocker door is capable of stowing the blocker door in response to an aborted landing.

BRIEF DESCRIPTION OF THE DRAWINGS

The subject matter of the present disclosure is particularly pointed out and distinctly claimed in the concluding portion of the specification. A more complete understanding of the present disclosure, however, may best be obtained by referring to the detailed description and claims when considered in connection with the drawing figures, wherein like numerals denote like elements.

FIG. 2B illustrates, in accordance with various embodiments, a cutaway perspective view of a jet aircraft propulsion system having a fan case comprising a deployed thrust reversing assembly.

DETAILED DESCRIPTION

The detailed description of exemplary embodiments herein makes reference to the accompanying drawings, which show exemplary embodiments by way of illustration. While these exemplary embodiments are described in sufficient detail to enable those skilled in the art to practice the inventions, it should be understood that other embodiments may be realized and that logical changes and adaptations in design and construction may be made in accordance with this invention and the teachings herein. Thus, the detailed description herein is presented for purposes of illustration only and not of limitation. The scope of the invention is defined by the appended claims. For example, the steps recited in any of the method or process descriptions may be executed in any order and are not necessarily limited to the order presented. Furthermore, any reference to singular includes plural embodiments, and any reference to more than one component or step may include a singular embodiment or step. Also, any reference to attached, fixed, connected or the like may include permanent, removable, temporary, partial, full and/or any other possible attachment option. Additionally, any reference to without contact (or similar phrases) may also include reduced contact or minimal contact.

As used herein, "aft" refers to the direction associated with the tail (e.g., the back end) of an aircraft, or generally, to the direction of exhaust of the engine. As used herein, "forward" refers to the direction associated with the nose (e.g., the front end) of an aircraft, or generally, to the direction of flight.

The nacelle may extend along the axis defined by the line marked A-A'. The portion near A may be referred to as forward and the portion near A' may be referred to as aft. In that regard, A is forward of A' and A' is aft of A.

Figure 1:
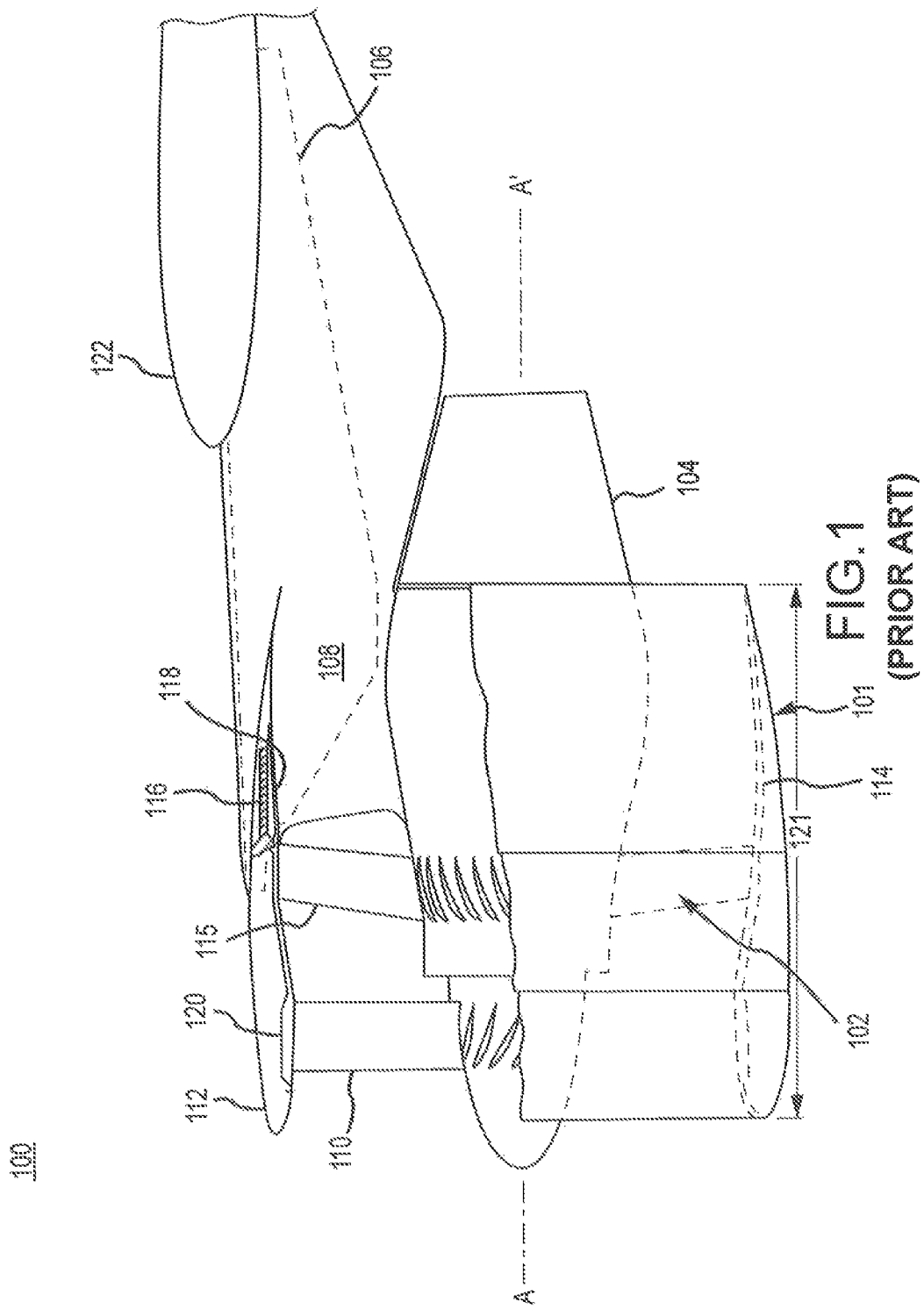
FIG. 1 illustrates a cutaway perspective view of a conventional jet aircraft propulsion system.

With reference now to FIG. 1, a cutaway perspective view of a conventional jet aircraft propulsion system 100 is shown. The propulsion system 100 may generally comprise an outer barrel 102, an IFS 104, and a supporting structure or pylon 106. The outer barrel 102 may comprise a generally annular structure defined by an outer surface situated radially outward of an inner surface. Similarly, the IFS 104 may comprise a generally annular structure defined by an outer surface situated radially outward of an inner surface thereof.

The IFS 104 may surround an engine core, which may burn a hydrocarbon fuel in the presence of oxygen to generate thrust. As described above, the inner surface of the outer barrel 102 may be situated substantially coaxially with and concentrically about the outer surface of the IFS 104. The radial separation between the inner surface of the outer barrel 102 and the outer surface of the IFS 104 may define a bypass air duct 108 through which bypass air may flow as a fan 110 rotates to drive air into the bypass air duct 108.

The outer barrel 102 may be divided into a plurality of sections. For example, the outer barrel 102 may comprise a fan cowl 112 and a thrust reversing assembly 101. The thrust reversing assembly may be situated aft of the fan cowl 112, and may include a translating sleeve 114, also situated aft of the fan cowl 112. The thrust reversing assembly 101 may also comprise a variety of components including, for example, a cascade array 116, and a plurality of bypass air blocking structures or blocker doors 118. The thrust reversing assembly 101, including the translating sleeve 114, cascade array 116, and blocker doors 118 (shown stowed) may be situated aft of the fan cowl 112. As shown, the fan cowl 112 may be coupled to a generally annular fan case 120 situated inward of the fan cowl 112. The fan case 120 may extend axially, from forward to aft, substantially between the fan 110 and a stator blade array 115).

During operation, the translating sleeve 114 may translate or shift aft to expose the cascade array 116, and the plurality of Hooker doors 118 may deploy within the bypass air duct 108 to turn airflow into and through the cascade array 116 to produce reverse thrust. The translating sleeve 114 (and more generally, the thrust reversing assembly 101) therefore contributes to the overall axial length of the outer barrel 102. For example, as shown, the outer barrel 102 may span a first axial distance 121.

The propulsion system 100 is typically mounted such that it extends forward, away from an aircraft wing 122. More particularly, the outer barrel 102 and/or the engine core may be mounted to the pylon 106, which may be coupled under the wing, and extend forward of the wing such that the outer barrel 102 is situated substantially forward of the forward edge of the wing 122. As described above, bypass air flows through the bypass air duct 108 during operation. However, if bypass air exits the bypass air duct 108 too near the forward edge of the wing, the bypass air may encounter the edge of the wing 122 such that turbulence is generated between bypass air exiting the bypass air duct 108 and the edge of the wing 122. Thus, the outer barrel 102, including the aft portion of the bypass air duct 108, is typically mounted sufficiently forward of the forward edge of the wing 122 to generate smooth airflow under and/or around the wing.

Therefore, as the axial span of the outer barrel 102 increases (e.g., due to inclusion of the thrust reversing assembly 101), the pylon 106 must typically extend sufficiently forward to accommodate smooth bypass airflow. However, as the pylon 106 extends forward to mount the engine and other propulsion system 100 components to the underside of the aircraft wing 122 (including the outer barrel 102), the stress experienced by the pylon 106 as a result of the weight of the propulsion system 100 increases as the pylon 106 is made to extend further away from the wing 122, in addition, as the span of the pylon 106 increases, the weight of the pylon 106 also increases.

Figure 2A:
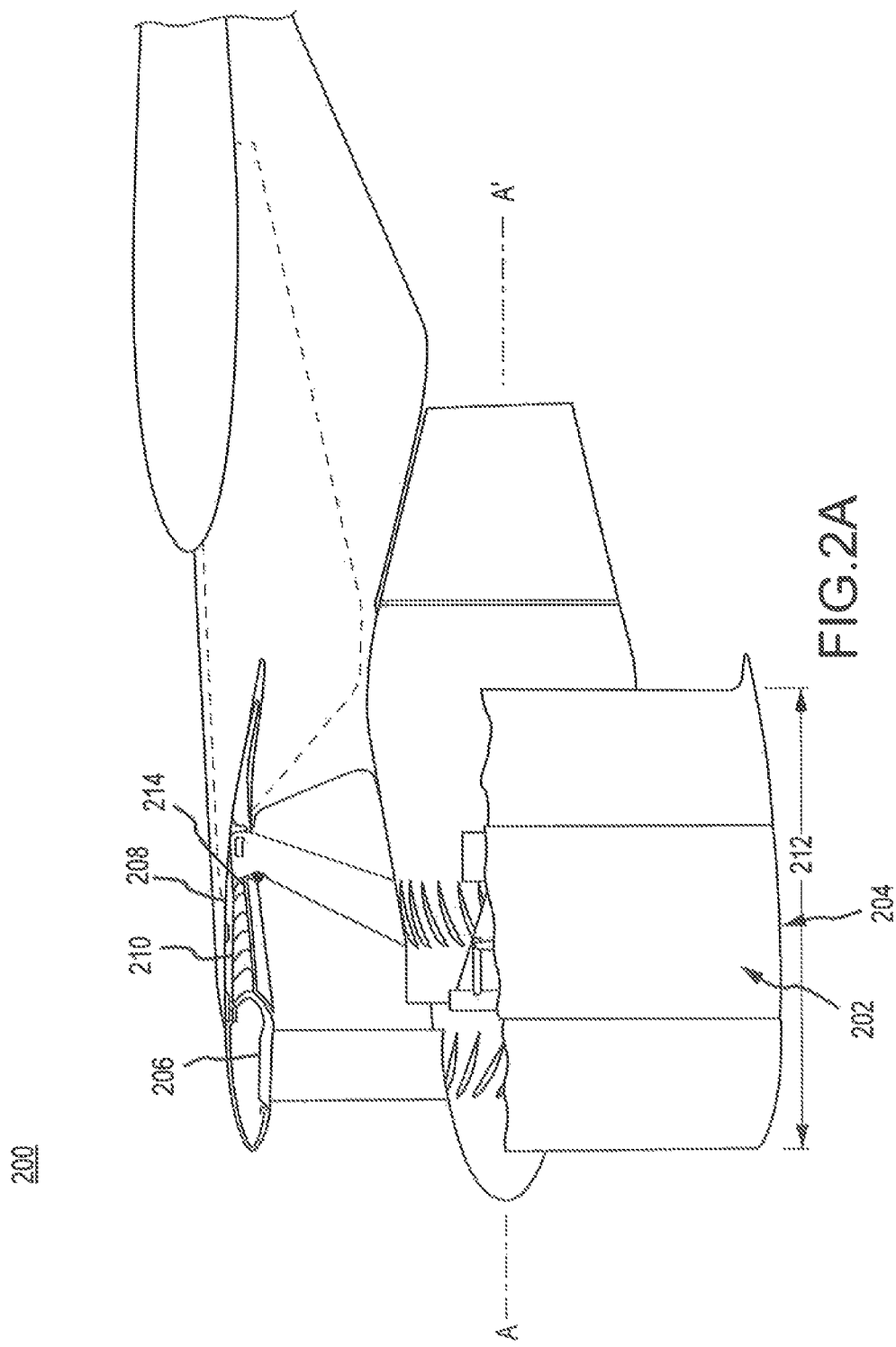
FIG. 2A illustrates, in accordance with various embodiments, a cutaway perspective view of a jet aircraft propulsion system having a fan case comprising a stowed thrust reversing assembly.

Therefore, with reference to FIG. 2A, a cutaway perspective view of an aircraft propulsion system 200 having an outer barrel 202 comprising fan case 206 is shown. The fan case 206 may comprise a thrust reversing assembly 204. As described herein, a thrust reversing assembly 204 may include a plurality of sleeves arranged circumferentially about the assembly 204 (e.g., as illustrated and as described herein for purposes of illustration, a sleeve 208). The outer barrel 202 may comprise a substantially annular structure having a radially inner surface as well as a radially outer surface. As shown, the propulsion system 200 may not include, as with conventional propulsion systems (e.g., system 100), a separate or isolated thrust reversing assembly 101. Rather, the thrust reversing assembly 204 may be incorporated in the fan case 206 (e.g., between the fan 110 at the forward end of the fan case 206 and the stator blade array 215 at the aft end of the fan case 206).

The sleeve 208 may be stowed to cover a cascade array 210 (and which may translate aft and/or hinge radially outward from the cascade array 210 during a thrust reversing operation to expose the cascade array 210). The propulsion system 200 may further include one or more blocker doors 214, which may be stowed, as shown in FIG. 2A, such that the cascade array 210 is covered or substantially covered by the blocker door(s) 214. Further, as shown, the outer barrel 202 may span a second axial distance 212.

As a result of incorporation of the thrust reversing assembly 204 in or with the fan case 206, the axial span of the outer barrel 202 may be reduced by the axial span formerly occupied by the conventional thrust reversing assembly 101. For example, the axial span of the outer barrel 102 may comprise the first axial distance 121 while the axial span of the outer barrel 202 may comprise the second axial distance 212. The first axial distance 121 may be greater than the second axial distance 212. For example, the span of the outer barrel 202 may be reduced by the span of the conventional thrust reversing assembly 101 (e.g., approximately, for example from 10 inches (25.4 cm) to 40 (101.6) inches and in various embodiments, about 30 inches (76.2 cm) by the elimination of the conventional thrust reversing assembly 101 from the propulsion system 200. Therefore, the outer barrel 202 may in fact be significantly shortened by the incorporation of the thrust reversing assembly 201 in the fan case 206.

With reference to FIG. 2B, a cutaway perspective view of the aircraft propulsion system 200 is shown. The thrust reversing assembly 204 of the aircraft propulsion system 200 is shown in a deployed configuration. As shown, the sleeve 208 may translate aft to expose the cascade array 210. As the sleeve 208 translates aft, a blocker door 214 may deploy radially inward within the bypass air duct 216 to block airflow in the bypass air duct 216 and turn the airflow 211 into the cascade array 210. Thus, in various embodiments, the sleeve 208 may translate axially aft to expose a radially outer portion of the cascade array 210 to the slip stream while the blocker door 214 may hinge radially inward to expose a radially inner portion of the cascade array 210 to the bypass air duct 216.

Further, in various embodiments, the sleeve 208 may, rather than translating aft as described above, hinge radially outward into the slip stream to expose the outer portion of the cascade array 210 to the slip stream. This configuration may increase drag. In particular, the blocker door 214 may turn air through the cascade array 210 to generate reverse thrust while the sleeve 208 may hinge into the slip stream to generate drag as the aircraft moves forward. Thus, in various embodiments, the blocker door 214 and sleeve 208 may deploy such that they resemble an open, "v-shaped" structure, such as a shape resembling an alligator clip. While such a structure may yield increased or improved thrust reversing force, the structure may also require increased ground clearance as well as impose greater structural loads.

The blocker door 214 may deploy, in various embodiments, at an angle within the bypass air duct 216. In particular, the blocker door 214 may deploy or hinge open such that a radially inward portion of the deployed blocker door 214 is situated forward of a radially outward portion of the deployed blocker door 214. Thus, during flight, very little impetus (e.g., a slight puff of air that exerts low pressure) may be utilized to initiate deployment of the blocker door 214 (e.g., because the force of the air flowing within the bypass air duct 216 may push or drag the blocker door 214 radially inward. However, in the case of an aborted landing, it may be desirable to stow the blocker door 214 quickly to permit airflow to resume passage through the bypass air duct 216. The blocker door 214 may therefore be coupled to an actuating mechanism 218, which may apply a force sufficient to overcome the force applied against the blocker door 214 by the onrush of air driven into the bypass air duct 216 by the fan 110 and against the forward surface of the blocker door 214.

Accordingly, the outer barrel 202 may, even in a deployed configuration, be shortened in comparison to a conventional outer barrel 102 by the difference between the first axial distance 121 and the second axial distance 212 (in many cases, approximately 20-30 inches) and limited only by aerodynamic requirements of the duct nozzle. Therefore, as described in detail above, the outer barrel 202 may be shifted aft toward the forward edge of the wing 122 as a result of the axially reduced span of the outer barrel 202. As the outer barrel 202 is shifted aft towards the forward edge of the wing 122, the span of the pylon mounting the propulsion system 200 to the underside of the wing 122 may be likewise reduced. As a result, the stress placed on the (cantilevered) pylon may be reduced, first, by the reduced weight of the propulsion system 200 (having no independent thrust reversing assembly 101), and, second, by the reduced span of the pylon itself. Further, the torque on the pylon may be reduced by shortening the pylon cantilever toward the wing 122. In addition, the weight of the propulsion system 200 may be reduced, which may correspond to an increase in fuel savings and increased efficiency.

The connecting lines shown in the various figures contained herein are intended to represent exemplary functional relationships and/or physical couplings between the various elements. It should be noted that many alternative or additional functional relationships or physical connections may be present in a practical system.

The described benefits, advantages, solutions to problems, and any elements that may cause any benefit, advantage, or solution to occur or become more pronounced are not to be construed as critical, required, or essential features or elements of the inventions. The scope of the inventions is accordingly to be limited by nothing other than the appended claims, in which reference to an element in the singular is not intended to mean "one and only one" unless explicitly so stated, but rather "one or more."

Systems, methods and apparatus are provided herein. In the detailed description herein, references to "one embodiment", "an embodiment", "various embodiments", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

Furthermore, no element, component, or method step in the present disclosure is intended to be dedicated to the public regardless of whether the element, component, or method step is explicitly recited in the claims. No claim element herein is to be construed under the provisions of 35 U.S.C. 112(f) unless the element is expressly recited using the phrase "means for." As used herein, the terms "comprises," "comprising," or any other variation thereof, are intended to cover a nonexclusive inclusion, such that a process, method, article, or apparatus that comprises a list of elements does not include only those elements but may include other elements not expressly listed or inherent to such process, method, article, or apparatus.

What is claimed is:

1. An aircraft propulsion system comprising: a generally annular fan case, axially defined with respect to a longitudinal axis of the generally annular fan case by a fan configured to be disposed at a forward end thereof and a stator blade array configured to be disposed at an aft end thereof; a thrust reversing assembly comprising at least a portion of the generally annular fan case, the generally annular fan case comprising a generally annular cascade array; wherein the thrust reversing assembly is located axially between the fan and the stator blade array; a blocker door configured to pivot radially inward to expose the generally annular cascade array; a sleeve situated at least partially about the generally annular cascade array, the sleeve configured to deploy to expose the cascade array; and a substantially annular outer barrel, the substantially annular outer barrel comprising a fan cowl situated concentrically about the generally annular fan case, the sleeve comprising a portion of the fan cowl, wherein the sleeve is translatable along the axial direction with respect to the longitudinal axis of the fan case, and the blacker door is configured to cover an inner surface of the generally annular cascade array such that bypass air flows through a bypass air duct defined between the blacker door and an inner fixed structure disposed radially inward of the blacker door, wherein translation of the sleeve along the cascade array to produce reverse thrust, and wherein the blacker door pivots via a hinge located axially forward of the stator blade array corresponding to an axial location of the cascade array with respect to the longitudinal axis of the generally annular fan case.

2. The aircraft propulsion system of claim 1, wherein the sleeve translates axially in an aft direction to expose the cascade array.

3. The aircraft propulsion system of claim 1, wherein, in response to the pivoting, the blocker door is angled into the direction of airflow within a bypass air duct, and wherein an actuating mechanism coupled to the blocker door is capable of stowing the blocker door in response to an aborted landing.

4. The aircraft propulsion system of claim 3, wherein a bypass air applies a force against the blocker door and the actuating mechanism applies a force sufficient to overcome the force against the blocker door.

5. The aircraft propulsion system of claim 1, wherein, in response to the pivoting, a radially inward end of the blocker door is situated forward of a radially outward end of the blocker door.

6. The aircraft propulsion system of claim 1, wherein the blocker door redirects airflow through the generally annular cascade array in response to the pivoting.

7. An aircraft propulsion system comprising: a thrust reversing assembly comprising a fan case, the fan case comprising: a cascade array; a sleeve situated at least partially about the cascade array, the sleeve configured to deploy to expose the cascade array, wherein the sleeve is translatable along an axial direction with respect to a longitudinal axis of the fan case; and a blocker door configured to pivot radially inward to expose the cascade array, wherein the blacker door is configured to cover an inner surface of the cascade array such that bypass air flows through a bypass air duct defined between the blocker door and an inner fixed structure disposed radially inward of the blocker door; and a substantially annular outer barrel, the substantially annular outer barrel comprising a fan cowl situated concentrically about the fan case, the sleeve comprising a portion of the fan cowl, wherein the thrust reversing assembly is disposed between a fan at a forward end thereof and a stator blade array at an aft end thereof, wherein translation of the sleeve along the axial direction from a slowed position to a deployed position exposes the cascade array to turn the bypass airflow into and through the cascade array to produce reverse thrust, and wherein the blocker door pivots via a hinge located axially forward of the stator blade array corresponding to an axial location of the cascade array with respect to the longitudinal axis of the fan case.

8. The aircraft propulsion system of claim 7, wherein the sleeve translates axially in an aft direction to expose the cascade array.

9. The aircraft propulsion system of claim 7, wherein the blocker door-is angled into the direction of airflow within a bypass air duct, and wherein an actuating mechanism coupled to the blocker door is capable of stowing the blocker door in response to an aborted landing.

10. The aircraft propulsion system of claim 7, wherein, in response to the pivoting, a radially inward end of the blocker door is situated forward of a radially outward end of the blocker door.

11. The aircraft propulsion system of claim 7, wherein the blocker door redirects airflow through the cascade array in response to the pivoting.

* * * * *

UNITED STATES PATENT AND TRADEMARK OFFICE
CERTIFICATE OF CORRECTION

| | | |
|---|---|---|
| PATENT NO. | : 9,726,110 B2 | Page 1 of 1 |
| APPLICATION NO. | : 14/090595 | |
| DATED | : August 8, 2017 | |
| INVENTOR(S) | : Norman J. James | |

It is certified that error appears in the above-identified patent and that said Letters Patent is hereby corrected as shown below:

In the Claims

In Column 6, Line 45, after the second instance of "the" please insert --axial direction from a stowed position to a deployed position exposes the generally annular cascade array to turn the bypass airflow into and through the generally annular--

In Column 6, Line 46, please delete "blacker" and insert --blocker--

Signed and Sealed this
Twenty-sixth Day of September, 2017

Joseph Matal
*Performing the Functions and Duties of the*
*Under Secretary of Commerce for Intellectual Property and*
*Director of the United States Patent and Trademark Office*